(12) United States Patent
Bendinelli et al.

(10) Patent No.: US 11,496,228 B2
(45) Date of Patent: Nov. 8, 2022

(54) BEAM AQUISITION AND CONFIGURATION DEVICE

(71) Applicant: Keysight Technologies, Inc., Santa Rosa, CA (US)

(72) Inventors: Enrico Bendinelli, Milan (IT); Luigi Travaglini, Milan (IT); Steffen Beyme, Morrisville, NC (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/188,090

(22) Filed: Mar. 1, 2021

(65) Prior Publication Data

US 2021/0367684 A1 Nov. 25, 2021

Related U.S. Application Data

(60) Provisional application No. 63/028,676, filed on May 22, 2020.

(51) Int. Cl.
*H04B 17/12* (2015.01)
*H04B 7/0426* (2017.01)
*H04B 17/10* (2015.01)

(52) U.S. Cl.
CPC ............. *H04B 17/12* (2015.01); *H04B 7/043* (2013.01); *H04B 17/104* (2015.01)

(58) Field of Classification Search
CPC ....... H04B 17/12; H04B 17/104; H04B 7/043
See application file for complete search history.

(56) References Cited

U.S. PATENT DOCUMENTS

| | | | |
|---|---|---|---|
| 10,313,034 B2* | 6/2019 | Rodriguez-Herrera | H04B 17/11 |
| 2011/0084887 A1* | 4/2011 | Mow | G01R 29/10 343/703 |
| 2016/0212641 A1* | 7/2016 | Kong | H04B 17/0087 |
| 2017/0111808 A1 | 4/2017 | Marini et al. | |
| 2019/0386760 A1 | 12/2019 | Li et al. | |

FOREIGN PATENT DOCUMENTS

| | | |
|---|---|---|
| CN | 206743260 U | 5/2017 |
| KR | 101286023 B1 | 7/2013 |
| KR | 101987815 B1 | 6/2019 |

OTHER PUBLICATIONS

English translation of KR101286023B1, 13 pgs.
English translation of KR101987815B1, 16 pgs.

(Continued)

*Primary Examiner* — Janice N Tieu

(57) ABSTRACT

A beamformer for providing signals from a device under test (DUT) and an emulator is disclosed. The beamformer includes: a radio frequency (RF) interface configured to receive a plurality of radio beams and convert a data stream comprising a plurality of radio beams from analog signals to digital signals; a radio samples processor configured to receive the digital signals, decouple data samples from the plurality of radio beams, and recombine the data samples to provide a single data stream to a corresponding single device used by an end-user; and a local processor adapted to dynamically adjust operational parameters in the radio samples processor of the single data stream.

8 Claims, 4 Drawing Sheets

(56) References Cited

OTHER PUBLICATIONS

Lijian Xin et al., "OTA Testing for Massive MIMO Devices Using Cascaded APM Networks and Channel Emulators", International Journal of Antennas and Propagation, vol. 2019, Article ID 6901383, 15 pgs.
Huaqiang Gao et al, "A Virtual Over-the-Air Method for 5G Massive MIMO Base Station Testing With Flexible Virtual Probes", IEEE Access, vol. 7, 2019, pp. 108474-108485.

* cited by examiner

BEAM AQUISITION AND CONFIGURATION DEVICE

CROSS REFERENCE TO RELATED APPLICATIONS

The present application also claims priority under 35 U.S.C. § 119(e) to commonly-owned U.S. Provisional Application No. 63/028,676, filed on May 22, 2020, and naming Enrico Bendinelli, et al. inventors. The entire disclosure of U.S. Provisional Application No. 63/028,676 is hereby specifically incorporated by reference in its entirety.

BACKGROUND

Mobile communications networks are ubiquitous in today's society. For example, in 4G and 5G mobile networks beamforming technology is used to extend the coverage and increase the capacity of the base stations (i.e., evolved Node B (eNB) or gNB base stations) use the same radio resources in time and frequencies to communicate multiple users in a network simultaneously.

Equipped with an appropriate antenna array, the base station may form different radio beams in different spatial directions, for both the transmission and reception of spatial data streams. Thus, multiple subscriber terminals (referred to herein as user equipment (UE) are located in different spatial positions, and can exchange data with the base station using one or more of these radio beams.

From a physical perspective, the same radiating elements of a single-panel array antenna are shared by one or several radio beams (i.e. all radiating elements contribute components to all beams). Consequently, the test environment of fifth generation (5G) and fourth generation (4G) base stations equipped with antenna arrays is affected by beamforming. UE Emulators used for testing base stations usually require dedicated radio frequency (RF) connections for each antenna. This is normally achieved by replacing the antenna with an RF connector and attaching the UE Emulator to the base station using RF cables. In the case of beamforming for multiple user MIMOs, where multiple UEs communicate with the same time and same frequency with the gNB and can, therefore only be distinguished by their spatial signature, however, this approach cannot be adopted because the radio signals of beams in certain network protocols associated simultaneously with multiple users are superposed and sent to (or received by) the same radiating elements of the base station array antenna. Since multiple radio beams are transmitted from (or received by) the same set of antenna elements, which are connected to the UE Emulator by RF cables, there is a need to separate the beams, in order to process the spatial streams for each user with as little interference from the other users' beams as possible.

During base station testing, beam separation must occur before connecting to any UE Emulator, as the UE Emulator is configured to access to the separated spatial streams. Over-the-air (OTA) operation in the test lab is impractical in most cases, due to the size and cost of the anechoic RF chambers and the antenna equipment involved. Furthermore, OTA operation in a RF chamber does not scale to multiple cells, nor does it support UE mobility easily.

Known methods and apparatuses used for beam separation are often customized solutions with radiating elements being replaced by RF connectors and the separation of the beams is performed using beam separation devices based on known Butler Matrix technology, which effects beam separation using a fixed (and thus static) Butler Matrix. Known testing systems based on Butler matrices provide a fixed, pre-configured set of beams to be provided to the UE emulator, and are thus inherently limited to a fixed set of beam directions and shapes. Because of the static nature of known Butler Matrix configurations, simulation of UE mobility (e.g., in the azimuth & elevation coordinates relative to the array antenna) is very difficult to implement. Accordingly, known beamforming schemes used in known UE testing devices have limited applicability.

What is needed, therefore, is an apparatus for beam forming for UE emulation that overcomes at least the drawbacks of the known beam formers described above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
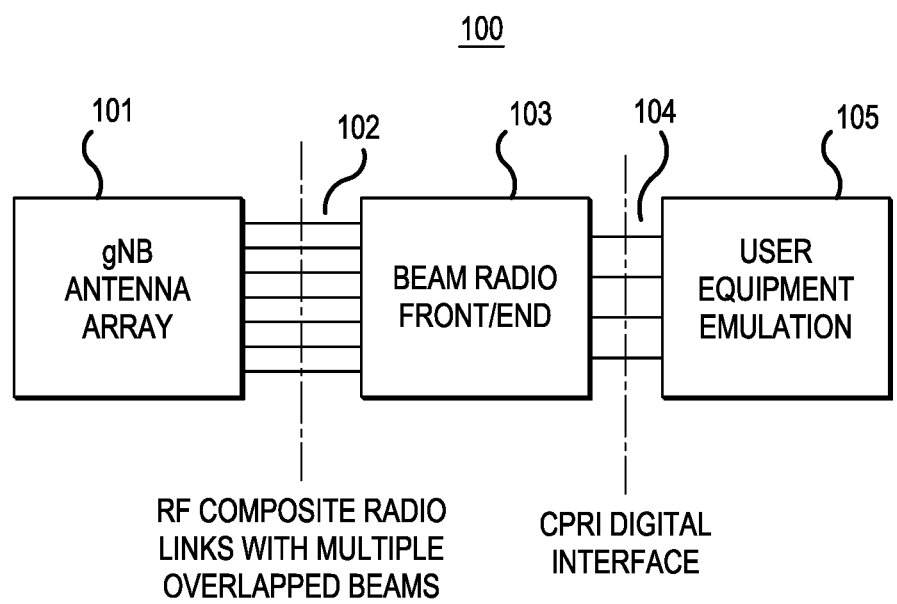
FIG. 1 is a simplified schematic block diagram of a system for testing a base station in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", or "coupled to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

Generally, the present teachings relate to a system for testing base stations and their interaction with mobile devices in a network. As described more fully below, the beamformers of various representative embodiments decouple multiple RF beams from a base station, and reconstruct individual dedicated UE spatial data streams. These individual dedicated UE spatial data streams are the provided to a dedicated digital Interface CPRI or eCPRI, which in turn is, to a UE Emulator.

In accordance with various representative embodiments, a system is described that is adapted to decouple multiple concurrent RF beams generated antenna array towards different space directions and provide relevant data as separate data streams on Common Public Radio Interface (CPRI) or enhanced CPRI (eCPRI) digital interfaces. Generally, the antenna array is adapted to effect connections from a base station operating under the 3rd Generation Partnership Project (3GPP) protocol such as the so-called 4$^{th}$ generation (4G) and fifth generation (5G) standards. The systems of the present teachings are adapted to decouple multiple RF beams generated in 4G and 5G antenna arrays and reconstruct the dedicated spatial data streams used by multiple user, multiple input-multiple output (MU-MIMO) UE Emulator equipment in 4G and 5G wireless telecommunications.

In accordance with a representative embodiment, a beamformer for providing signals from a device under test (DUT) and an emulator is described. The beamformer comprises: a radio frequency (RF) interface configured to receive a plurality of radio beams and convert a data stream comprising a plurality of radio beams from analog signals to digital signals; a radio samples processor configured to receive the digital signals, decouple data samples from the plurality of radio beams, and recombine the data samples to provide a single data stream to a corresponding single device used by an end-user; and a local processor adapted to dynamically adjust operational parameters in the radio samples processor of the single data stream.

In accordance with another representative embodiment, a beamformer for providing signals from a device under test (DUT) and an emulator is disclosed. The beamformer comprises a radio frequency (RF) interface configured to receive a plurality of radio beams and convert a data stream comprising a plurality of radio beams from analog signals to digital signals; a radio samples processor configured to receive the digital signals, decouple data samples from the plurality of radio beams, and recombine the data samples to provide a single data stream to a corresponding single device used by an end-user; and a local processor comprising a memory that stores instructions, which when executed by the local processor cause the local processor dynamically to adjust operational parameters in the radio samples processor of the single data stream.

FIG. 1 is a simplified schematic block diagram of a system 100 for testing a base station in accordance with a representative embodiment.

The system comprises an antenna array 101, which is illustratively a gNB antenna array for a 5G network. The antenna array 101 is disposed between a base station (not shown in FIG. 1) and a beam radio front/end 103. As will become clearer as the present description continues, the beam radio front/end 103 functions to receive signals from the antenna array 101 and provide them to a UE Emulator 105. This acquisition of radio signals from the antenna array 101, their reconfiguration by the beam radio front/end 103 and their ultimate return to the base station under test is sometimes referred to as beam formation. As such, the beam radio front/end 103 is referred to as beam former 103 herein. Various details of the beam former 103 are provided in greater detail below.

The antenna array 101 is connected to the beam former 103 by a suitably RF transmission line, connected between the antenna output and the inputs to the beam former 103 with suitable RF connectors (not shown). As will be described more fully below, each output from the antenna array 101 transmits a large number (e.g., 64) of a superposition of beam components for use in the mobile network. By the present teachings, this plurality of beams is digitized, separated, and transmitted to the UE Emulator 105 after having certain parameters applied for the purposes of testing via the UE emulator 105. Further details of the UE emulator 105 are found in commonly owned U.S. Patent Application Publication 20170111808 to Marini, et al. The entire disclosure of U.S. Patent Application Publication 20170111808 is specifically incorporated herein by reference.

As described more fully below, by the present teachings the new radio (NR) signal structure is recognized, and reference symbols are sometimes used to estimate and equalize the composite spatial channel resulting from gNB beamforming by the beam former 103 and the conducted or near-field channel between the array antenna 101 and the beam former 103. The beam former 103 and system 100 of the present teachings are configured to test all a variety of types of beamforming as anticipated by the NR standard 3GPP 5G-NR as published by the 3GPP standards organization.

In some 5G networks, a UE emulator 105 measures the signal quality of different beams (SSB and/or channel state information-reference signal (CSI-RS)) from a pre-configured, static set, and decides on the best beam to use at the beginning of as well as during a connection. The measurements are reported to the network, which may drive the selection of the beam, or beams. Notably, in certain representative embodiments, values different from the actual measurement may be introduced or reported to by the UE emulator 105 to test the NB response.

In other 5G networks the UE emulator 105 estimates the spatial channel based on received CSI-RS and suggests to the gNB a beam it determines to be the best match for this channel, from a predefined codebook.

In yet other 5G networks, the multi-user spatial channel is estimated by the gNB based on a (channel) sounding reference signal (SRS)transmissions. The SRS a signal sent on the UL from the UE (or the UE emulator 105) to the gNB to allow the gNB to estimate either channel quality, or the spatial channel response between UE and gNB. These SRS transmissions are made from the mobile devices (UEs), implying that reciprocity between downlink and uplink must hold, based on which the gNB computes an optimal (in some appropriate sense) multi-user beamforming solution, which is not restricted to either a pre-configured set, or a codebook of beams, and instead relies on e.g. block diagonal precoding based on eigendecomposition and on singular value decomposition (SVD) are common.

By contrast to known solutions which have the disadvantage of being statically configured, whereby the beam configuration must be calibrated in advance and cannot be changed dynamically during a test, imposing severe restrictions to the test scope in a laboratory environment, the beam former 103 is dynamically reconfigurable enabling real-time alteration of the signals provided to the UE emulator 105 for testing.

Figure 2:
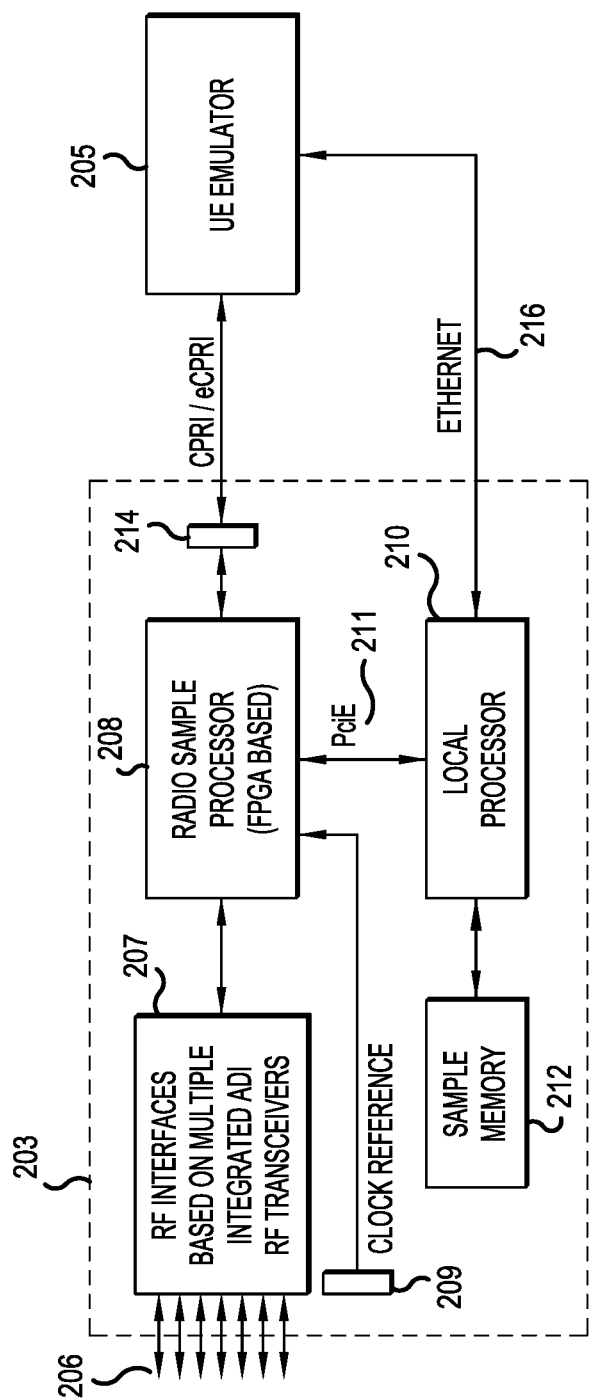
FIG. 2 is a simplified schematic block diagram of a beam former for providing test signals to a UE emulator in accordance with a representative embodiment.

FIG. 2 is a simplified schematic block diagram of a beam former 203 for providing test signals to a UE emulator 205 in accordance with a representative embodiment. Various aspects, details, and applications of the system 100 described above in connection with FIG. 1 may be common to those of the beam former 203 and UE emulator 205. These common aspects, details and applications are not necessarily repeated.

The beam former 203 comprises an RF Interface 207 which is adapted to connect via a plurality of ports 206 to a base station (not shown in FIG. 2). In accordance with a representative embodiment, the plurality of ports 206 are connected to an array antenna (not shown in FIG. 2) by a set of RF cables. The RF interface 207 is configured to connect to an antenna array having multiple elements. By way of illustration, the RF Interface 207 is adapted to connect to 32 separate antennae, each with two states of polarization, with each antenna providing a plurality of radio signals for delivery to mobile devices of the communications network. So, the RF Interface 207 connects with 64 elements, which is common in known communications systems, where each element is adapted to carry multiple radio signals. As described more fully below, the separation of the multiple, superposed antenna signals is performed by the radio sample processor 208, which is configured by a local processor 210 (described below) for this task. The RF interface 207 receives/transmits the superposed signals from/to the gNB antenna array, with comparatively high quality comparatively low noise.

As will become clearer as the present description continues, in one representative embodiment, the RF Interface 207 comprises a plurality of integrated RF transceivers, and converts the spatial stream of signals in the RF domain from the base station to digital time-domain samples, and vice versa. In another representative embodiment, the RF Interface 207 converts the spatial stream of signals in the RF domain from the base station to digital frequency-domain samples, and vice versa.

The RF Interface 207 also generates a synchronized sampling clock signal 209 for its multiple RF transceivers and applies phase and gain calibration to the antenna signals, to ensure the coherent processing of all array antenna elements, and reciprocity between uplink and downlink, if required.

The beam former 203 also comprises a radio sample processor 208, which is illustratively a field-programmable gate array (FPGA) or similar programmable logic device. The radio sample processor 208 receives radio samples coming from the RF Interface 207 and provides spatial streams to the attached UE Emulator 205. Notably, at this point, the local processor separates the beams. Moreover, and as described more fully below, the radio sample processor receives spatial streams coming from the Digital Baseband Interface (see FIGS. 2 and 3) and providing radio samples to the RF Interface 207. Notably, on the uplink (UL), the reverse of beam separation happens; the purposeful superposition of the beam signals is carried out to present to the gNB antenna array 101.

As described more fully below in connection with the representative embodiments of FIGS. 3 and 4, among other functions, the radio sample processor 208 is adapted to process a plurality of parallel radio sample streams (e.g., 64 as noted above) from the RF Interface 207 in order to detect and track SSB transmissions from the gNB.

In steady-state operation, and as described more fully below, the radio sample processor 208 performs multiplications of a complex L×M matrix A with a M×1 vector of time-domain radio samples, resulting in a L×1 vector of time-domain spatial stream samples on the downlink. Similarly, the radio sample processor performs multiplications of a complex M×L matrix with a L×1 vector of samples from L spatial streams, resulting in a vector of M×1 time-domain radio samples on the uplink (see FIG. 4). Notably, in scenarios where reciprocity holds, the M×L matrix represents the conjugated transpose (i.e., the Hermitian) of the downlink matrix A.

In accordance with another representative embodiment, the radio samples to/from the RF interface 207 are subject to time-frequency transformation by fast Fourier Transformation (e.g., (I)FFT). In this implementation, the matrix operations described above are performed not on time-domain radio samples, but their frequency-domain representation as subcarriers. In this variant, the Digital Baseband Interface (not shown in FIG. 2) has to support subcarrier-domain data representations, such as eCPRI (see FIG. 4).

Notably, the matrix elements are reconfigured dynamically by the local processor 210. Typically, multiple sets of matrix coefficients may be cached on-chip and loaded into the matrix multiplier (see FIGS. 3 and 4) to become effective as needed at specific times, or for different resource blocks defined in the frequency domain. The beam former 203 also comprises a local processor 210 that functions to provide auto calibration and system management. Notably, in accordance with representative embodiments, autocalibration comprises an automated process of measuring, and subsequently compensating, any a-priori uncertain values of the attenuation and phase of each physical connection between a gNB antenna element of the antenna array 101 and the input of the RF interface 207. This connection can either be made using known RF transmission lines, which have tolerances in length, can be sensitive to bending, torque of the RF connectors, or by a near-field radio channel between the gNB array and the beam former 203. Moreover, and in accordance with representative embodiments, system management illustratively comprises initializing the beamformer after power-up, which includes programming the FPGA's volatile configuration memory, and programming the RF frontend hardware, which for example, comprises tuning tune to carrier frequency, setting gains/attenuators, 5G-NR numerology parameters, and initiating up communication with the UE Emulator 205. In steady state, sample timing and carrier frequency are beneficially tracked to within much less than 1 ppm of their nominal values.

As described more fully below in connection with FIGS. 3 and 4, the local processor interfaces to the UE Emulator 205 and may continuously exchange information concerning CSI-RS channels operational parameter (or SSB parameter if used as reference signal), to compute, configure and reconfigure the Radio Sample Processor's matrix multiplier coefficients.

The beam former 203 also comprises a sample memory 212. To support various diagnostic tests that the user may want to perform, radio samples are buffered in an external memory that is controlled and can be read out by the local processor 210, which sends the buffered sample data to a user's workstation for off-line analysis.

Notably, the local processor 210 may comprise one or more computer processors, digital signal processors (DSPs), central processing unit (CPU), graphics processing unit (GPU), field-programmable gate arrays (FPGAs), application specific integrated circuits (ASICs), or combinations thereof, using any combination of hardware, software, firmware, hard-wired logic circuits, or combinations thereof.

The local processor 210 may include its own memory for storing computer readable code (e.g., software, software modules, software engines) that enables performance of the various functions described herein. For example, the processing memory may store software instructions/computer readable code executable by the local processor 210 for performing some or all aspects of methods described herein. Alternatively, the sample memory 212 may store software instructions/computer readable code executable by the local processor 210 for performing some or all aspects of methods described herein.

As used herein, the sample memory 212, the memory of the local processor, and any other memory (and databases) described herein, may be various types of random access memory (RAM), read only memory (ROM) and/or other storage media, including flash memory, electrically programmable read-only memory (EPROM), electrically erasable and programmable read only memory (EEPROM), compact disk read only memory (CD-ROM), digital versatile disk (DVD), registers, latches, flip-flops, a hard disk, a removable disk, tape, floppy disk, blu-ray disk, or universal serial bus (USB) driver, or any other form of storage medium known in the art, which are tangible and non-transitory (e.g., as compared to transitory propagating signals). Memories may be volatile or non-volatile, secure and/or encrypted, unsecure and/or unencrypted, without departing from the scope of the present teachings.

As described more fully below in connection with FIG. 3, the local processor 210 determines and provides system parameters necessary to perform the function of the SSB Sync/Track and system management, such as the radio carrier frequency and the NR numerology to use. Once synchronization is established, the local processor 210 estimates the spatial channel based on the beamformed SSB transmissions and configures the equalizer matrix A in the Radio Sample Processor such that the attached UE Emulator 205 can start its normal operation. Next, the UE Emulator 205 acquires and sends such system information to the local processor 210 that is necessary to configure the radio sample processor 208 to coherently receive signals (e.g. CSI-RS transmissions on all M antenna elements), based on which the local processor 210 performs spatial channel estimation and computes suitable equalizer matrices A to be loaded into the radio sample processor 208. As shown, the UE Emulator 205 is connected to the beam former 203 by a set of optical fibers (CPRI), or Ethernet links (eCPRT). Feedback from the UE emulator 205 is provided illustratively by an Ethernet link 216. In some test scenarios, the UE emulator 205 simulates the spatial position of each UE. The spatial position may even be time-varying, to simulate mobility. It is then necessary to feed back to the local processor 210 of the beam former 203 the (new) UE positions, so that a set of parameters (i.e., matrix coefficients) representing a spatial RF channel consistent with the new UE positions can be determined and loaded into the radio sample processor 208. In yet other scenarios, the emulated UE reports to the gNB the beam(s) the UE determines to be optimal (in some appropriate sense) for its currently simulated position and channel condition, using a predefined codebook. It is then necessary for the UE emulator 205 to feed codebook indices back to the beam former 203 in order to maintain consistency between the reported beams and the configuration of the spatial channel matrix as emulated by the radio sample processor 208.

Figure 3:
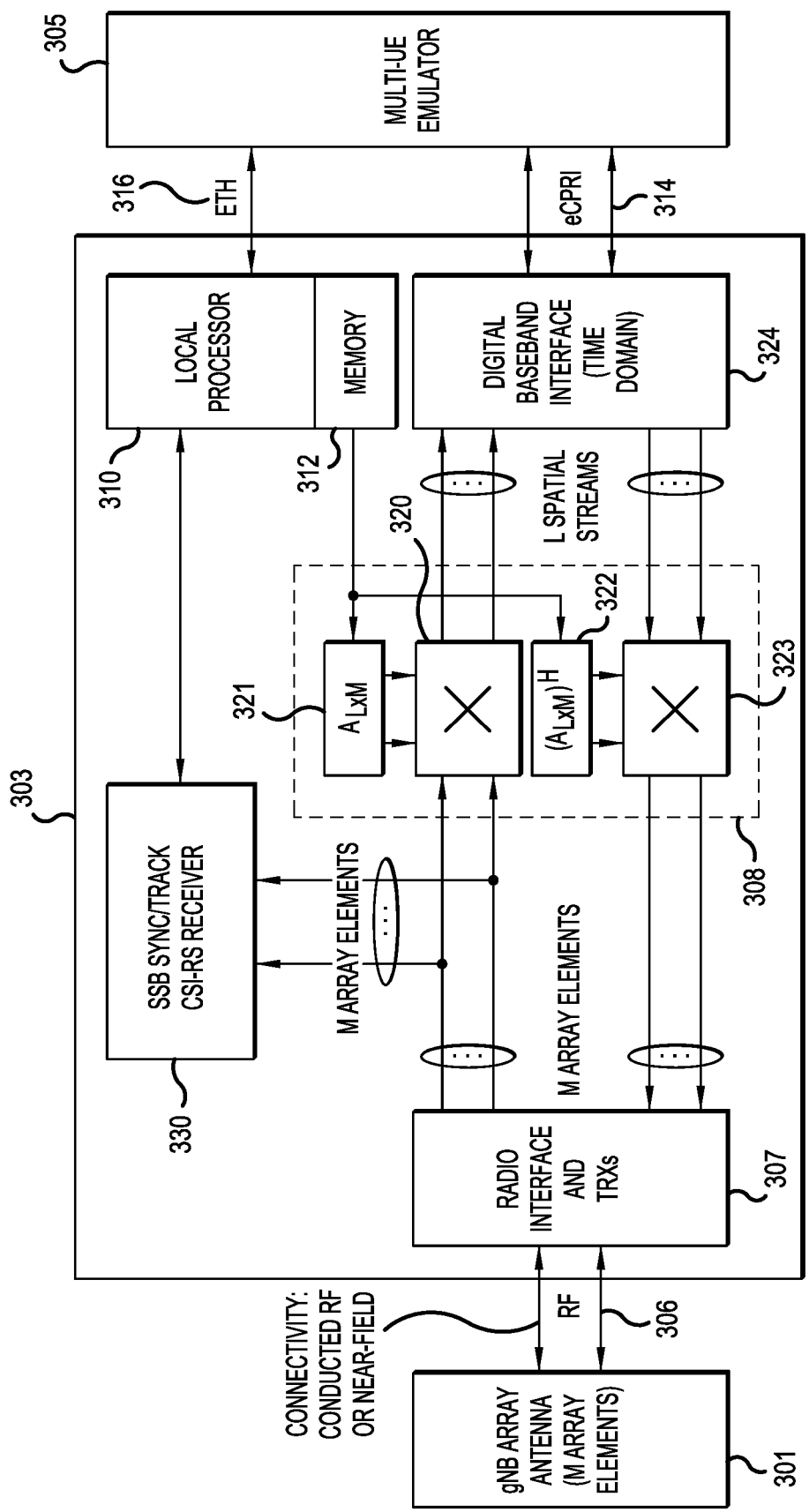
FIG. 3 is a simplified schematic block diagram of a beam former for providing time-domain radio samples to a UE emulator in accordance with a representative embodiment.

FIG. 3 is a simplified schematic block diagram of a beam former for providing time-domain radio samples to a UE emulator in accordance with a representative embodiment.

Various aspects, details, and applications of the system 100 described above in connection with FIG. 1, and the beam former 203 and UE emulator 205 described in connection with FIG. 2, may be common to those of the beam former 303 and multi-UE emulator 305 of the presently described representative embodiments. These common aspects, details and applications are not necessarily repeated.

The beam former 303 comprises an RF Interface 307 which is adapted to connect via a plurality of ports 306 to a base station (not shown in FIG. 3). In accordance with a representative embodiment, the plurality of ports 306 are connected to an array antenna (not shown in FIG. 3) by a set of RF cables. As alluded to above, multiple RF signals enter via the plurality of ports 306 and are received at the RF Interface 307 for separation. Illustratively, at each of the ports 306 the totality of these signals represents the superposition of a number of individually beamformed data streams. By the present teachings these superposed signals are separated into individual signals and represented by vectors for multiplication by the FPGA. As a result, the separated (i.e., equalized) beams and their respective data streams are provide for further processing before being transmitted to the Multiple-UE emulator 305.

The RF interface 307 is configured to connect to an antenna array having multiple elements. By way of illustration, the RF Interface 307 is adapted to connect to 32 separate antennae, each with two states of polarization, with each antenna providing a plurality of radio signals for delivery to mobile devices of the communications network. So, the RF Interface 307 connects with 64 elements, which is common in known communications systems, where each element is adapted to carry multiple radio signals.

In the presently described representative embodiments, the RF Interface 307 comprises a plurality of integrated RF transceivers, and converts the spatial stream of signals in the RF domain from the base station to digital time-domain samples, and vice versa.

The beam former 303 also comprises a local processor 310 that functions to provide auto calibration. The local processor 310 includes it own memory 312 in the presently described representative embodiment. As described more fully below, the local processor 310 interfaces to a multiple-UE Emulator 305 and may continuously exchange information concerning CSI-RS channels operational parameter (or SSB parameter if used as reference signal), to compute, configure and reconfigure the matrix multiplier coefficients generated by the radio sample interface.

The beam former 203 comprises a radio sample processor 308, which comprises a first matrix multiplier 320 and a second matrix multiplier 323, which illustratively are components of an FPGA or other suitably PLD.

The first matrix multiplier 320 is connected to a first matrix input 321, which comprises a memory that stores the matrix coefficients, or indeed whole sets of precomputed matrix coefficients, for quick recall/reconfiguration) locally in the first matrix multiplier, which is illustratively an FPGA. The first matrix input 321 also receives matrix elements (also referred to herein as operational parameters) calculated in the local processor 310, and as described below, performs matrix calculations, which are provided to a digital baseband interface 324, which, in the present representative embodiment is a time-domain interface. As will be appreciated, communication between UE emulators (e.g., multi-UE emulator 305) and the RF radio equipment thereof relies on a stream of time-domain samples. This is the operating mode of the widely used CPRI optical baseband interface (also used by many gNB manufacturers)

The digital baseband interface 324 typically connects the beam former 303 with the Multi-UE Emulator 305, and comprises of multiple CPRI lanes, or eCPRT connections. In a typical configuration, e.g. L=16 spatial streams may be supported. The second matrix multiplier 323 is connected to a second matrix input 322, which comprises a memory that stores the matrix coefficients, or indeed whole sets of precomputed matrix coefficients, for quick recall/reconfiguration) locally in the FPGA device. The second matrix input 322 also receives matrix elements calculated in the local processor 310, and as described below, performs matrix calculations of these matrix elements (also referred to herein as operational parameters) and the input from the digital baseband interface 324. The second matrix multiplier 323 uses a matrix that represents (i.e. emulates) the UL spatial channel. This matrix can be the Hermitian of the first matrix (namely when the UL and DL are exactly reciprocal, which is desirable but usually not achievable exactly), but not always. If it is Hermitian, then the calculation of the second matrix is trivial, because the Hermitian is the conjugated transpose of the first matrix. In other cases, the second matrix is illustratively computed directly based on UE position, antenna geometry, and carrier frequency.

As described below in connection with representative embodiments, vectors representing signals (e.g., 64 signals) from the antenna array 301, which is illustratively a phased array antenna, received at a desired sample rate, are multiplied by multiplication of the input e treat as a vectors of with a particular equalizer matrix, which is that inverts the composite of the gNB beamforming and the RF channel that are illustratively connected via RF cables or by near field connection. As such, the particular equalizer matrix in effect reconstructs the original spatial streams, which is one useful aspect of the present teachings. Notably, even if the individual antenna element signals are perfectly separated (by using cables), the beamforming operation by the gNB itself effects the superposition of the different spatial streams, before they reach the antenna array 301. There is a beamforming matrix in the gNB responsible for that. In the following paragraphs, it is denoted matrix B, and this effect must be undone.

As describe more fully below, the matrix is case specific. The operational parameters, which are matrix elements, of the matrix are computed by the local processor 310. The operational parameters are downloaded into the first matrix input 321 radio sample processor and there fed into the first matrix multiplier 320, which performs the multiplication of the matrix with the vector of antenna signals described above. The output of the matrix multiplier is another vector based on the calculated equalizer matrix, with each component of the output vector representing a sample of one of the original data streams. With repeated matrix multiplication over time, the radio sample processor reconstruct the original data streams from the base station, and are provided to different mobile users.

In testing operations, the radio access network is periodically (or semi-persistently, or aperiodically) sending a clean beam pilot signal towards the pre-configured beams on a special physical channel (there are two mechanisms, SSB based or CSI-RS based) to let the UE take beam strength measurements.

In this scenario, the matrix A in the radio sample processor 308 can be configured to equalize the spatial channel, which is the composite of the gNB beamforming matrix B and the channel C between the gNB array antenna and the RF Interface 307, such that the multiple-UE Emulator 305 will be presented with the individual beams on separate ports of the digital baseband interface 324, with minimal interference between the beam signals. In a time-domain duplex (TDD) system, such as depicted in FIG. 3, conjugate operations may be performed on the uplink. A set of orthogonal reference signals such as CSI-RS on multiple antenna ports, here represented by a matrix X, is transmitted over this channel. The local processor 310 uses information previously provided by the multi-UE Emulator to establish and maintain synchronization with the received RF signal from the RF Interface 307 and demodulates the reference signals of interest.

Notably, the information used in this demodulation sequence may be time/frequency location and configuration of the reference signals, The beam former 303 of the present teachings is thus configured to receive and demodulate the reference signal transmissions. The signal received at the RF Interface is:

$Y=CBX$

The local processor 310 estimates the composite channel $H=CB$ by performing $\hat{H}=YX^H$ and computes an equalizer matrix A using appropriate inverses, such as ZF (zero-forcing) or MMSE. For example, under the zero-forcing criterion, the local processor computes the pseudo-inverse $A=(\hat{H}^H\hat{H})^{-1}\hat{H}^H$ and configures the Radio Sample Processor accordingly.

In a second common application scenario, the radio access network is periodically (or semi-persistently, or aperiodically) transmitting different orthogonal CSI-RS signals from every antenna element of the antenna array 301. The signal received at the RF interface 307 is $Y=CX$ such that the local processor 310 may estimate the channel C between the antenna array 301 and the RF Interface 307 by performing the following matrix calculation $\hat{C}=YX^H$ In this scenario, the gNB typically selects beamforming vectors from a codebook of orthogonal beams, based on feedback from the multi-UE emulator 305. Therefore, multi-UE Emulator 305 has a measure of control over, and is aware of the beamforming matrix B, such that the Local Processor determines the composite channel as $$\hat{H} = \hat{C}B$$

computes an equalizer matrix A as above, for example $$A = (\hat{H}^H \hat{H})^{-1} \hat{H}^H$$

and configures the Radio Sample Processor accordingly.

In yet another application scenario, the user of the test system may wish to position mobile devices (UE) at specific coordinates (such as azimuth and elevation angles) relative to the gNB array antenna. Moreover, the positions of the UEs may be time-variant to simulate mobility. In this scenario, the spatial channel matrix A can be constructed from row-vectors of phase factors $$A_{u,1:M} = [e^{jk_u d_1} e^{jk_u d_2} \ldots e^{jk_u d_M}]$$

where the vectors $d_i$ describe the spatial displacements of the individual array elements and the vector $k_u(\theta,\varphi)$ is the wave vector corresponding to the direction of user u, specified in terms of the user's azimuth and elevation relative to the array antenna.

In this scenario, equalization, in the sense of cancellation of the interference between beams and in particular, between users in MU-MIMO, relies on precoding at the gNB, which can be based on e.g. SRS transmissions from the individual UEs.

In this scenario, it is required that the conducted channel C is known because, in contrast to other scenarios, it is not estimated as part of the equalization. It is frequently the case that the RF cable connections between the gNB connectorized array antenna and the invention are not phase coherent, e.g. due to differences in cable lengths or variations in the complex impedance. To avoid time-consuming manual calibration, the beam former 303 of the present teachings incorporates methods to auto-calibrate phase coherency, by making use of either proprietary, dedicated antenna calibration signals (where available), or reference signals such as SSB, CSI-RS or DMRS. The availability of signals suitable for auto-calibration signals varies widely with network and antenna configuration, but a common requirement for auto-calibration is that the calibration signal is transmitted from every antenna element. In some cases, the invention applies optimization algorithms to estimate iteratively the matrix C which characterizes the conducted RF channel between the gNB array antenna and the invention's RF Interface. The inverse of this matrix can then be multiplied with the spatial channel matrix A (as defined above), and the product loaded into the Radio Sample Processor. Processing of SSB transmissions is carried out by a synchronization signal block (SSB) sync/track CSI-RS receiver 330. The SSB Sync/Track CSI-RS receiver 330 performs correlation operations between the antenna input signal and a local replica of the SSB, which is a set of periodically transmitted signals by the gNB, which have a signature known to the receiver in order to detect the presence of the periodic SSB transmission and establish initial timing alignment ("sync") of the beam former 303 with the gNB, and subsequently maintain precise timing alignment and also carrier frequency alignment (i.e., "track")

Figure 4:
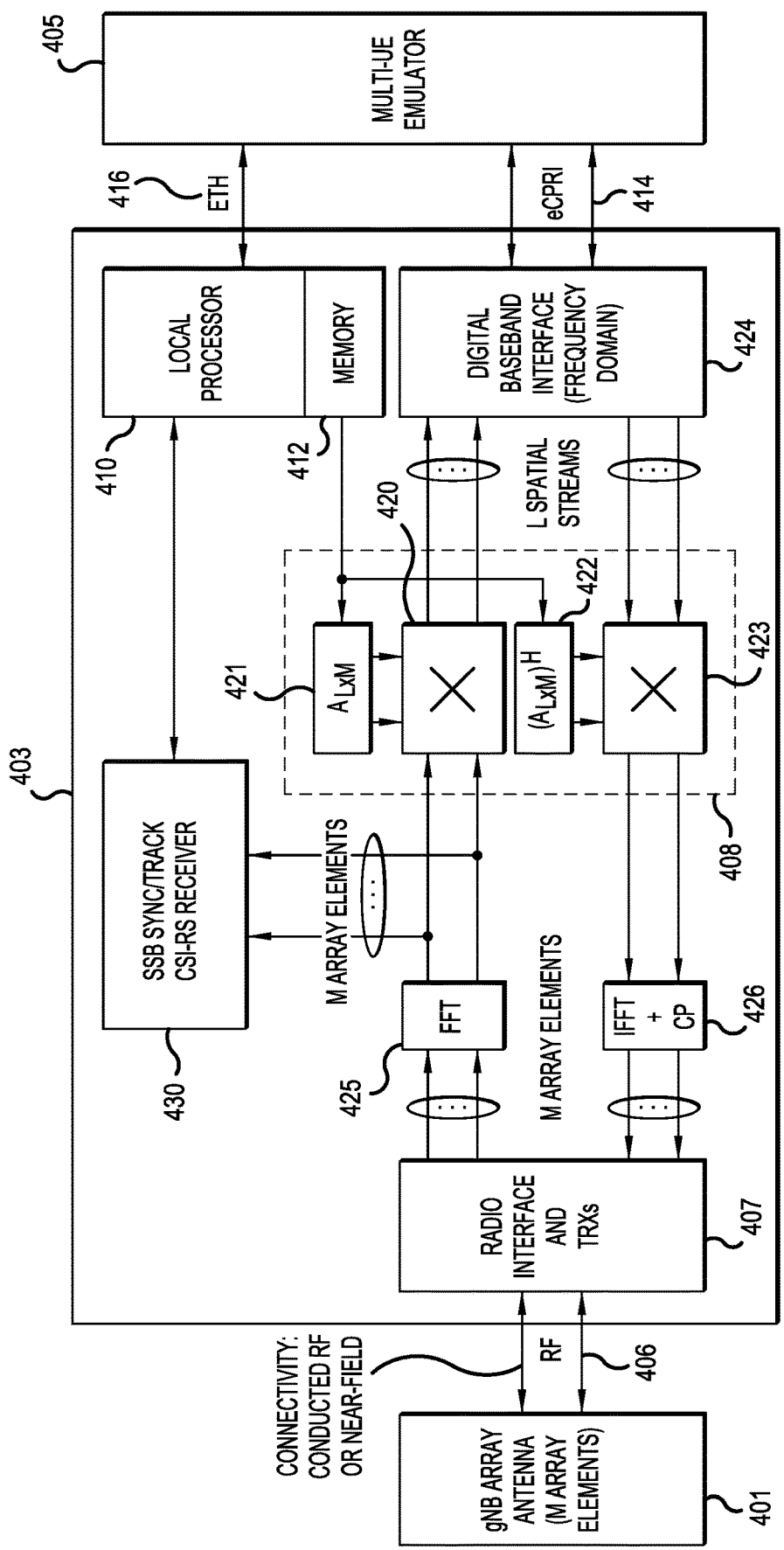
FIG. 4 is a simplified schematic block diagram of a beam former for providing frequency-domain radio samples to a UE emulator in accordance with a representative embodiment.

FIG. 4 is a simplified schematic block diagram of a beam former for providing frequency-domain radio samples to a UE emulator in accordance with a representative embodiment.

Various aspects, details, and applications of the system 100 described above in connection with FIG. 1, and the beam former 203 and UE emulator 205 described in connection with FIG. 2, may be common to those of the beam former 403 and multi-UE emulator 405 of the presently described representative embodiments. These common aspects, details and applications are not necessarily repeated.

The beam former 403 comprises an RF Interface 407 which is adapted to connect via a plurality of ports 406 to a base station (not shown in FIG. 3). In accordance with a representative embodiment, the plurality of ports 406 are connected to an array antenna (not shown in FIG. 3) by a set of RF cables. As alluded to above, multiple RF signals enter via the plurality of ports 406 and are received at the RF Interface 407 for separation. Illustratively, at each of the ports 406 the totality of these signals represents the superposition of a number of individually beamformed data streams. By the present teachings these superposed signals are separated into individual signals and represented by vectors for multiplication by the FPGA. As a result, the separated (i.e., equalized) beams and their respective data streams are provide for further processing before being transmitted to the Multiple-UE emulator 405.

The RF interface 407 is configured to connect to an antenna array having multiple elements. By way of illustration, the RF Interface 407 is adapted to connect to 32 separate antennae, each with two states of polarization, with each antenna providing a plurality of radio signals for delivery to mobile devices of the communications network. So, the RF Interface 407 connects with 64 elements, which is common in known communications systems, where each element is adapted to carry multiple radio signals.

In the presently described representative embodiments, the RF Interface 407 comprises a plurality of integrated RF transceivers, and converts the spatial stream of signals in the RF domain from the base station to digital frequency-domain samples, and vice versa.

The beam former 403 also comprises a local processor 410 that functions to provide auto calibration. The local processor 410 includes it own memory 412 in the presently described representative embodiment. As described more fully below, the local processor 410 interfaces to a multi-UE Emulator 405 and may continuously exchange information concerning CSI-RS channels operational parameter (or SSB parameter if used as reference signal), to compute, configure and reconfigure the matrix multiplier coefficients generated by the radio sample interface.

The beam former 203 comprises a radio sample processor 408, which comprises a first matrix multiplier 420 and a second matrix multiplier 423, which illustratively are components of an FPGA or other suitably PLD.

The first matrix multiplier 420 is connected to a first matrix input 421, which comprises a memory that stores the matrix coefficients, or indeed whole sets of precomputed matrix coefficients, for quick recall/reconfiguration) locally in the first matrix multiplier, which is illustratively an FPGA. The first matrix input 421 also receives matrix elements (also referred to herein as operational parameters) calculated in the local processor 410, and as described below, performs matrix calculations, which are provided to a digital baseband interface 424, which, in the present representative embodiment is a frequency-domain interface. As will be appreciated, communication between UE emulators (e.g., multi-UE emulator 405) and the RF radio equipment thereof relies on a stream of frequency-domain samples. This is the operating mode of the widely used CPRI optical baseband interface (also used by many gNB manufacturers)

The digital baseband interface 424 typically connects the beam former 403 with the Multi-UE Emulator 405, and comprises of multiple CPRI lanes, or eCPRT connections. In a typical configuration, e.g. L=16 spatial streams may be supported. The second matrix multiplier 423 is connected to a second matrix input 422, which comprises a memory that stores the matrix coefficients, or indeed whole sets of precomputed matrix coefficients, for quick recall/reconfiguration) locally in the FPGA device. The second matrix input 422 also receives matrix elements calculated in the local processor 410, and as described below, performs matrix calculations of these matrix elements (also referred to herein as operational parameters) and the input from the digital baseband interface 424. The second matrix multiplier 423 uses a matrix that represents (i.e. emulates) the UL spatial channel. This matrix can be the Hermitian of the first matrix (namely when the UL and DL are exactly reciprocal, which is desirable but usually not achievable exactly), but not always. If it is Hermitian, then the calculation of the second matrix is trivial, because the Hermitian is the conjugated transpose of the first matrix. In other cases, the second matrix is illustratively computed directly based on UE position, antenna geometry, and carrier frequency.

As described below in connection with representative embodiments, vectors representing signals (e.g., 64 signals) from the antenna array 401, which is illustratively a phased array antenna, received at a desired sample rate, are multiplied by multiplication of the input e treat as a vectors of with a particular equalizer matrix, which is that inverts the composite of the gNB beamforming and the RF channel that are illustratively connected via RF cables or by near field connection. As such, the particular equalizer matrix in effect reconstructs the original spatial streams, which is one useful aspect of the present teachings. Notably, even if the individual antenna element signals are perfectly separated (by using cables), the beamforming operation by the gNB itself effects the superposition of the different spatial streams, before they reach the antenna array 401. There is a beam-forming matrix in the gNB responsible for that. In the following paragraphs, it is denoted matrix B, and this effect must be undonet.

As describe more fully below, the matrix is case specific. The operational parameters, which are matrix elements, are computed by the local processor 410. The operational parameters are downloaded into the first matrix input 421 radio sample processor and there fed into the first matrix multiplier 420, which performs the multiplication of the matrix with the vector of antenna signals described above. The output of the matrix multiplier is another vector based on the calculated equalizer matrix, with each component of the output vector representing a sample of one of the original data streams. With repeated matrix multiplication over time, the radio sample processor reconstruct the original data streams from the base station, and are provided to different mobile users.

In testing operations, the radio access network is periodically (or semi-persistently, or aperiodically) sending a clean beam pilot signal towards the pre-configured beams on a special physical channel (there are two mechanisms, SSB based or CSI-RS based) to let the UE take beam strength measurements.

In this scenario, the matrix A in the radio sample processor 408 can be configured to equalize the spatial channel, which is the composite of the gNB beamforming matrix B and the channel C between the gNB array antenna and the RF Interface 407, such that the multi-UE Emulator 405 will be presented with the individual beams on separate ports of the digital baseband interface 424, with minimal interference between the beam signals. In a frequency-domain duplex (FDD) system, such as depicted in FIG. 4, conjugate operations may be performed on the uplink. A set of orthogonal reference signals such as CSI-RS on multiple antenna ports, here represented by a matrix X, is transmitted over this channel. The local processor 410 uses information previously provided by the multi-UE Emulator 405 to establish and maintain synchronization with the received RF signal from the RF Interface 407 and demodulates the reference signals of interest.

Notably, the information used in this demodulation sequence may be time/frequency location and configuration of the reference signals, The beam former 403 of the present teachings is thus configured to receive and demodulate the reference signal transmissions. The signal received at the RF Interface is:

$$Y=CBX$$

The local processor 410 estimates the composite channel H=CB by performing $$\hat{H}=YX^H$$

and computes an equalizer matrix A using appropriate inverses, such as ZF or MMSE such as the time/frequency location and configuration of the reference signals. For example, under the zero-forcing criterion, the local processor computes the pseudo-inverse $$A=(\hat{H}^H\hat{H})^{-1}\hat{H}^H$$

and configures the Radio Sample Processor accordingly.

In another application second common scenario, the radio access network is periodically (or semi-persistently, or aperiodically) transmitting different orthogonal CSI-RS signals from every antenna element of the antenna array 401. The signal received at the RF interface 407 is $$Y=CX$$

such that the local processor 410 may estimate the channel C between the antenna array 401 and the RF Interface 407 by performing the following matrix calculation $$\hat{C}=YX^H$$

In this scenario, the gNB typically selects beamforming vectors from a codebook of orthogonal beams, based on feedback from the multi-UE emulator 405. Therefore, multi-UE Emulator 405 has a measure of control over, and is aware of the beamforming matrix B, such that the Local Processor determines the composite channel as $$\hat{H}=\hat{C}B$$

computes an equalizer matrix A as above, for example $$A=(\hat{H}^H\hat{H})^{-1}\hat{H}^H$$

and configures the Radio Sample Processor accordingly.

In yet another application, the user of the test system may wish to position mobile devices (UE) at specific coordinates (such as azimuth and elevation angles) relative to the gNB array antenna. Moreover, the positions of the UEs may be time-variant to simulate mobility. In this scenario, the spatial channel matrix A can be constructed from row-vectors of phase factors $$A_{u,1:M}=[e^{jk_u d_1}e^{jk_u d_2}\ldots e^{jk_u d_M}]$$

where the vectors $d_i$ describe the spatial displacements of the individual array elements and the vector $k_u(\theta,\varphi)$ is the wave vector corresponding to the direction of user u, specified in terms of the user's azimuth and elevation relative to the array antenna.

In this scenario, equalization, in the sense of cancellation of the interference between beams and in particular between users in MU-MIMO, relies on precoding at the gNB, which can be based on e.g. SRS transmissions from the individual UEs.

In this scenario, it is required that the conducted channel C is known because, in contrast to other scenarios, it is not estimated as part of the equalization. It is frequently the case that the RF cable connections between the gNB connectorized array antenna and the invention are not phase coherent, e.g. due to differences in cable lengths or variations in the complex impedance. To avoid time-consuming manual calibration, the beam former 403 of the present teachings incorporates methods to auto-calibrate phase coherency, by making use of either proprietary, dedicated antenna calibration signals (where available), or reference signals such as SSB, CSI-RS or DMRS. The availability of signals suitable for auto-calibration signals varies widely with network and antenna configuration, but a common requirement for auto-calibration is that the calibration signal is transmitted from every antenna element. In some cases, the invention applies optimization algorithms to estimate iteratively the matrix C which characterizes the conducted RF channel between the gNB array antenna and the invention's RF Interface. The inverse of this matrix can then be multiplied with the spatial channel matrix A (as defined above), and the product loaded into the Radio Sample Processor. Processing of SSB transmissions is carried out by an SSB sync/track CSI-RS receiver 330. The SSB Sync/Track CSI-RS receiver 330 performs correlation operations between the antenna input signal and a local replica of the SSB, which is a set of periodically transmitted signals by the gNB, which have a signature known to the receiver in order to detect the presence of the periodic SSB transmission and establish initial timing alignment ("sync") of the beam former 403 with the gNB, and subsequently maintain precise timing alignment and also carrier frequency alignment (i.e., "track")

Finally, the beam former 403 comprises a fast Fourier transformation (FFT) 425 and an inverted FFT (IFFT) 426. The FFT 425 is hardware, or software, or both that computes the discrete Fourier transform (INT) of a sequence to transform a baseband signal between the frequency and time domain, and is a device known to one of ordinary skill in the art. The IFFT 426425 is hardware, or software, or both that computes the inverse DFT (IDFT) The FFT 425 and the IFFT use Fourier analysis to converts the baseband signal from its (original) time domain to a representation in the frequency domain, and vice versa.

One or more embodiments of the disclosure may be referred to herein, individually and/or collectively, by the term "teachings" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable a person ordinarily skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A beamformer for providing signals from a device under test (DUT) and an emulator, the beamformer comprising:
   a radio frequency (RF) interface configured to receive a plurality of radio beams and convert a data stream comprising a plurality of radio beams from analog signals to digital signals;
   a radio samples processor configured to receive the digital signals, decouple data samples from the plurality of radio beams, and recombine the data samples to provide a single data stream to a corresponding single device used by an end-user; and
   a local processor adapted to dynamically adjust operational parameters in the radio samples processor of the single data stream.

2. The beamformer of claim 1, wherein the operational parameters comprise phase of each of the plurality of radio beams comprising each single data stream.

3. The beamformer of claim 1, wherein the radio samples processor comprises a programmable logic device configured selectively to shift a phase of each of the plurality of radio beams comprising each single data stream.

4. The beamformer of claim 1, wherein the local processor continuously updates operational parameters of signals from the emulator, and determines the shift of the phase of each of the plurality of radio beams comprising each single data stream.

5. A beamformer for providing signals from a device under test (DUT) and an emulator, the beamformer comprising:
   a radio frequency (RF) interface configured to receive a plurality of radio beams and convert a data stream comprising a plurality of radio beams from analog signals to digital signals;
   a radio samples processor configured to receive the digital signals, decouple data samples from the plurality of radio beams, and recombine the data samples to provide a single data stream to a corresponding single device used by an end-user; and
   a local processor comprising a memory that stores instructions, which when executed by the local processor cause the local processor dynamically to adjust operational parameters in the radio samples processor of the single data stream.

6. The beamformer of claim 5, wherein the operational parameters comprise phase of each of the plurality of radio beams comprising each single data stream.

7. The beamformer of claim 5, wherein the radio samples processor comprises a programmable logic device configured selectively to shift a phase of each of the plurality of radio beams comprising each single data stream.

8. The beamformer of claim 5, wherein the local processor continuously updates operational parameters of signals from the emulator, and determines the shift of the phase of each of the plurality of radio beams comprising each single data stream.

* * * * *